United States Patent
Sanchez et al.

(10) Patent No.: US 7,677,525 B2
(45) Date of Patent: Mar. 16, 2010

(54) VEGETATION ATTACHMENT DEVICE

(76) Inventors: Martin Solario Sanchez, 167 10th St., McFarland, CA (US) 93250; Leonardo Favio Sanchez, 167 10th St., McFarland, CA (US) 93250

( * ) Notice: Subject to any disclaimer, the term of this patent is extended or adjusted under 35 U.S.C. 154(b) by 490 days.

(21) Appl. No.: 11/504,189

(22) Filed: Aug. 14, 2006

(65) Prior Publication Data
US 2008/0034649 A1   Feb. 14, 2008

(51) Int. Cl.
*F16M 11/00* (2006.01)

(52) U.S. Cl. .............. 248/690; 248/339; 24/30.5 S; 24/543; 24/563

(58) Field of Classification Search .......... 248/690, 248/339, 301, 305, 306, 308; 24/30.5 S, 24/343, 563, DIG. 29, 543; D11/200, 209, D11/206, 207, 210, 213; D32/58, 60, 61; D3/201; D8/395
See application file for complete search history.

(56) References Cited

U.S. PATENT DOCUMENTS

| | | | |
|---|---|---|---|
| 4,050,187 A | 9/1977 | Geiger et al. | |
| 4,329,762 A | 5/1982 | Maidof | |
| 4,615,140 A | 10/1986 | Frano | |
| 5,046,222 A * | 9/1991 | Byers et al. | 24/343 |
| 5,205,530 A * | 4/1993 | Fish | 248/690 |
| 5,381,588 A * | 1/1995 | Nelson | 24/30.5 S |
| 6,059,241 A * | 5/2000 | Martone | 248/230.1 |
| 6,378,175 B1 | 4/2002 | Vanderpan | |

* cited by examiner

*Primary Examiner*—A. Joseph Wujciak, III
(74) *Attorney, Agent, or Firm*—James M. Duncan, Esq.; Klein, DeNatale, Goldner, et al.

(57) ABSTRACT

A vegetation attachment device for supporting plant limbs is used in combination with an overhead support member, such as the horizontal support wire of a trellis system used to support grape vines. Embodiments of the device generally comprise an attachment hook configured to engage the overhead support wire, a closing hook, a catch member for engaging the closing hook, a deformable limb containment structure, and biasing means for maintaining the engagement of the closing hook to the catch member. The deformable limb containment structure deforms to accommodate limited lateral deflection or growth in the vine or plant limb. Embodiments of the disclosed apparatus may be used instead of currently known devices, such as wire ties, for supporting vines and branches.

8 Claims, 9 Drawing Sheets

VEGETATION ATTACHMENT DEVICE

BACKGROUND OF THE INVENTION

The present invention generally relates to supporting devices for plant limbs and more particularly to a clipping apparatus for securing a vine or plant limb to a support wire or trellis, such as supporting grape vines to suspended support wires. The generally known method for securing plant limbs to trellis wire is to use flexible tie wires, string, or similar items to attach the vines or limbs to the wire. Another method is to simply wrap the vine around the supporting wire. However, both of these methods have disadvantages. Both are labor intensive, particularly for a large vineyard. Using tying devices can be harmful to the plant if the tie is applied too tightly. In addition, pruning or trimming vines can be complicated because of the risk of inadvertently severing the trellis wire while attempting to prune the branch or cane of the plant. Another disadvantage of tying devices is that they typically must be replaced every season such that new ties must be installed in the following season.

SUMMARY OF THE INVENTION

Embodiments of the invention disclosed herein provide a solution to the need identified above. Embodiments of the disclosed apparatus are used in combination with an overhead support member, such as the horizontal support wire of a trellis system used so support grape vines. The disclosed vegetation attachment device generally comprises an attachment hook configured to engage the overhead support wire, a closing hook, a catch member for engaging the closing hook, a deformable limb containment structure, and biasing means for maintaining the engagement of the closing hook to the catch member. The deformable limb containment structure deforms to accommodate limited lateral deflection or growth in the vine or plant limb. The deformable limb containment structure may either be integral to the body of the device, or, alternatively, comprise a flexible member which cooperatively engages a wire body member such that loop sections in the wire body member are closed by the flexible member.

DETAILED DESCRIPTION OF THE EMBODIMENTS

Figure 1:
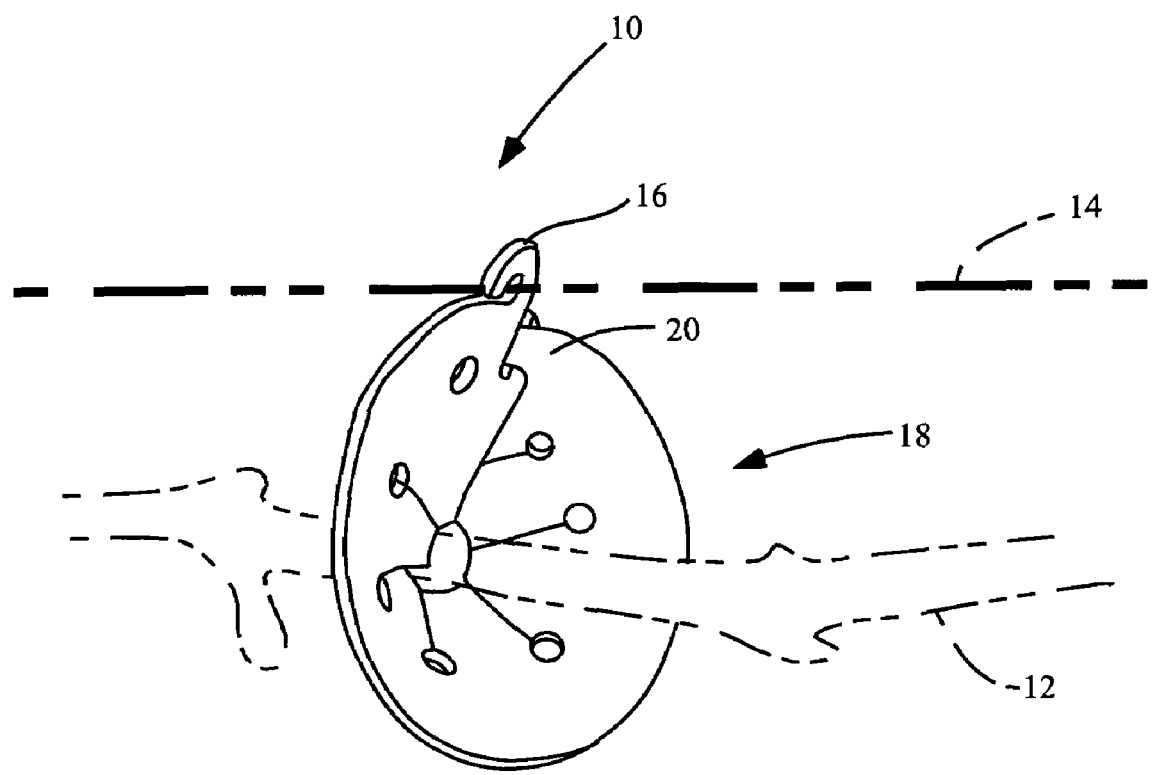
FIG. 1 shows an embodiment of the disclosed device being used to support a vine member from a support wire.

Referring now to the drawings, FIG. 1 shows a first embodiment 10 of the disclosed device being used to support a vine or branch member 12 from a support wire 14. This embodiment generally comprises attachment hook 16, which is an integral part of body member 18. This embodiment further comprises an integral closing hook 20, shown in detail in FIG. 2. Closing hook 20 engages catch member 22 to maintain this embodiment 10 in a "closed" position.

Figure 2:
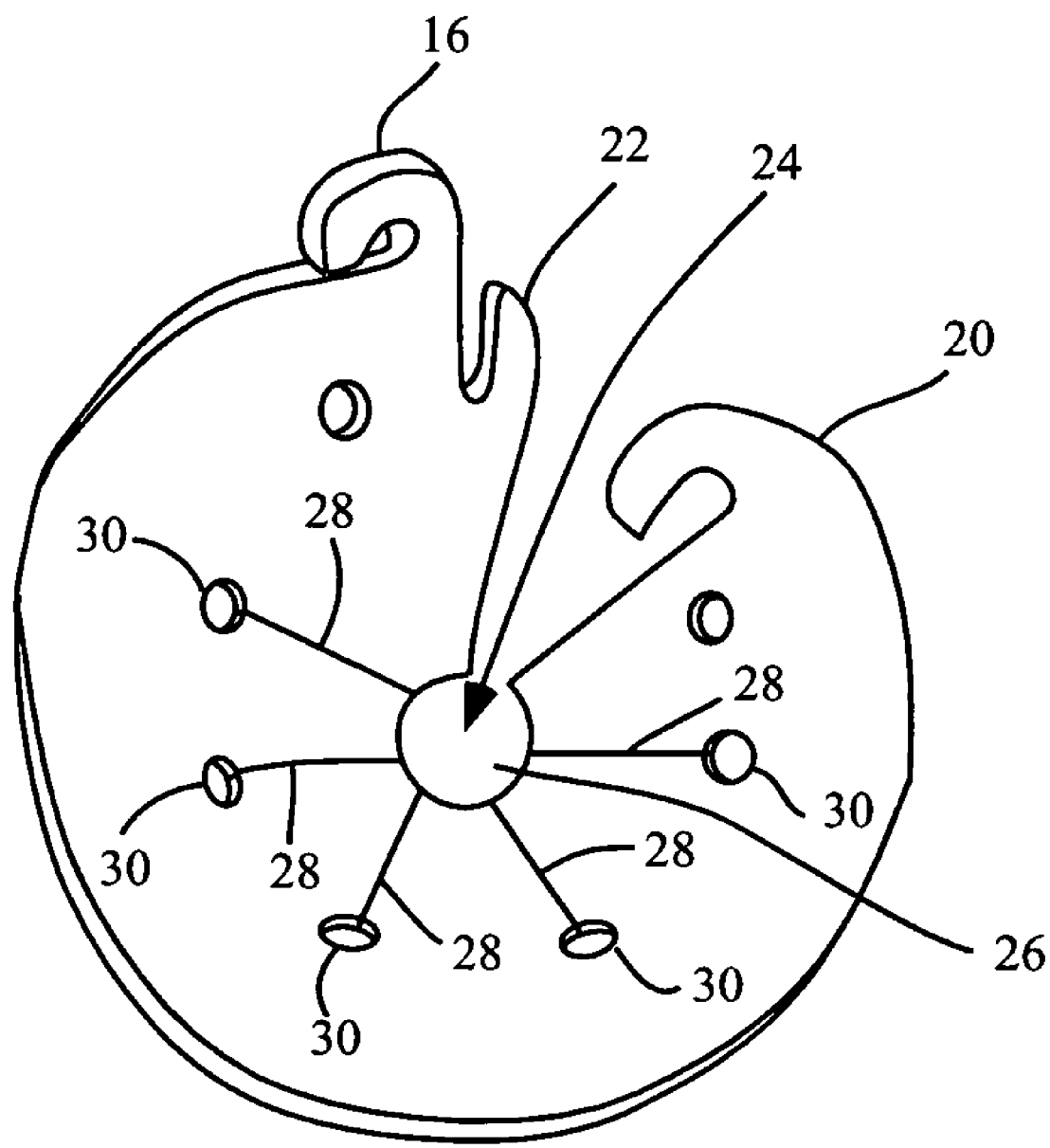
FIG. 2 depicts a front view of the device shown in FIG. 1, in which the device is an "open" position.

FIG. 2 shows the first embodiment 10 in an "open" position, i.e., closing hook 20 is not engaged to catch member 22. In the open position, the embodiments shown in FIGS. 1-9 will generally be flat. By compressing body member 18, a user is able to easily engage closing hook 20 to catch member 22. When the embodiments shown in FIGS. 1-9 are in the closed position where closing hook 20 is engaged to catch member 22, compression of the device causes these embodiments to assume a "cup" configuration such as that shown in FIG. 5.

The device further comprises biasing means which apply tension to the closing hook 20 to maintain the engagement of the closing hook to the catch member 22. For the embodiments shown in FIGS. 1 through 9, the biasing means is generally provided by the material itself, that is the material is flexible and must be compressed to engage the closing hook 20 to the catch member 22. The material used to manufacture this embodiment 10, and the other embodiments shown in FIGS. 1 through 9, must be sufficiently flexible and elastic to maintain the device in a closed position when the closing hook 20 engages the catch member 22. That is, the biasing means for maintaining the engagement of closing hook 20 to catch member 22 is integral to the body member 18. In addition to being flexible and elastic, the material should have weather resistant properties. Such materials may include, but are not limited to, plastic, metal foil, or tar paper. While the embodiments shown in FIGS. 1 through 9 are generally circular in shape, it is to be appreciated that other shapes may be used as well.

The device further comprises a deformable limb containment structure 24. The deformable limb containment structure 24 deforms so as to allow lateral deflection of the vine or plant limb 12. For example, in the event of weather conditions which may cause movement of the vine or plant limb, such as wind or rain, the deformable limb containment structure 24 allows limited deflection of the limb 12 within the device.

For the embodiments shown in FIGS. 1 through 9, the deformable limb containment structure 24 comprises a central aperture 26, from which there is a plurality of outwardly radiating splits 28. Each split 28 terminates at a secondary aperture 30. The deformable limb containment structure 24 has flaps 32 between the radiating splits 28 which readily deform to allow deflection of the vine member 12.

Figures 3, 5:
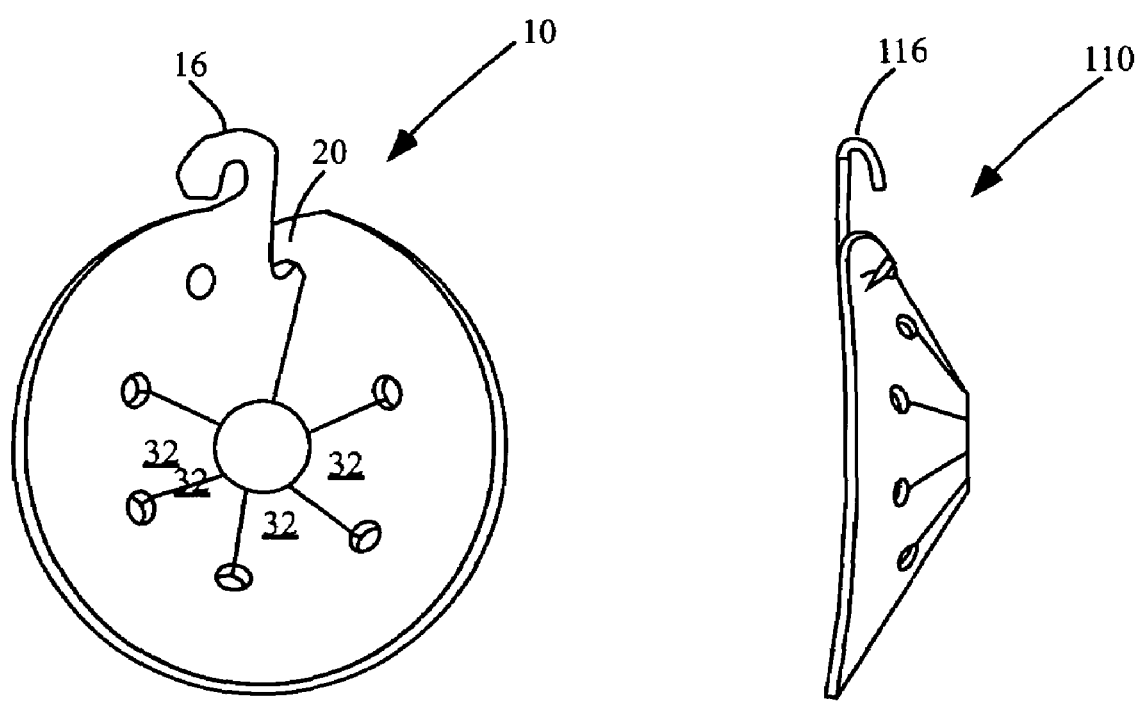
FIG. 3 depicts a front view of the device shown in FIG. 1, in which the device is a "closed" position.
FIG. 5 shows a side view of the device shown in FIG. 4.
Figure 4:
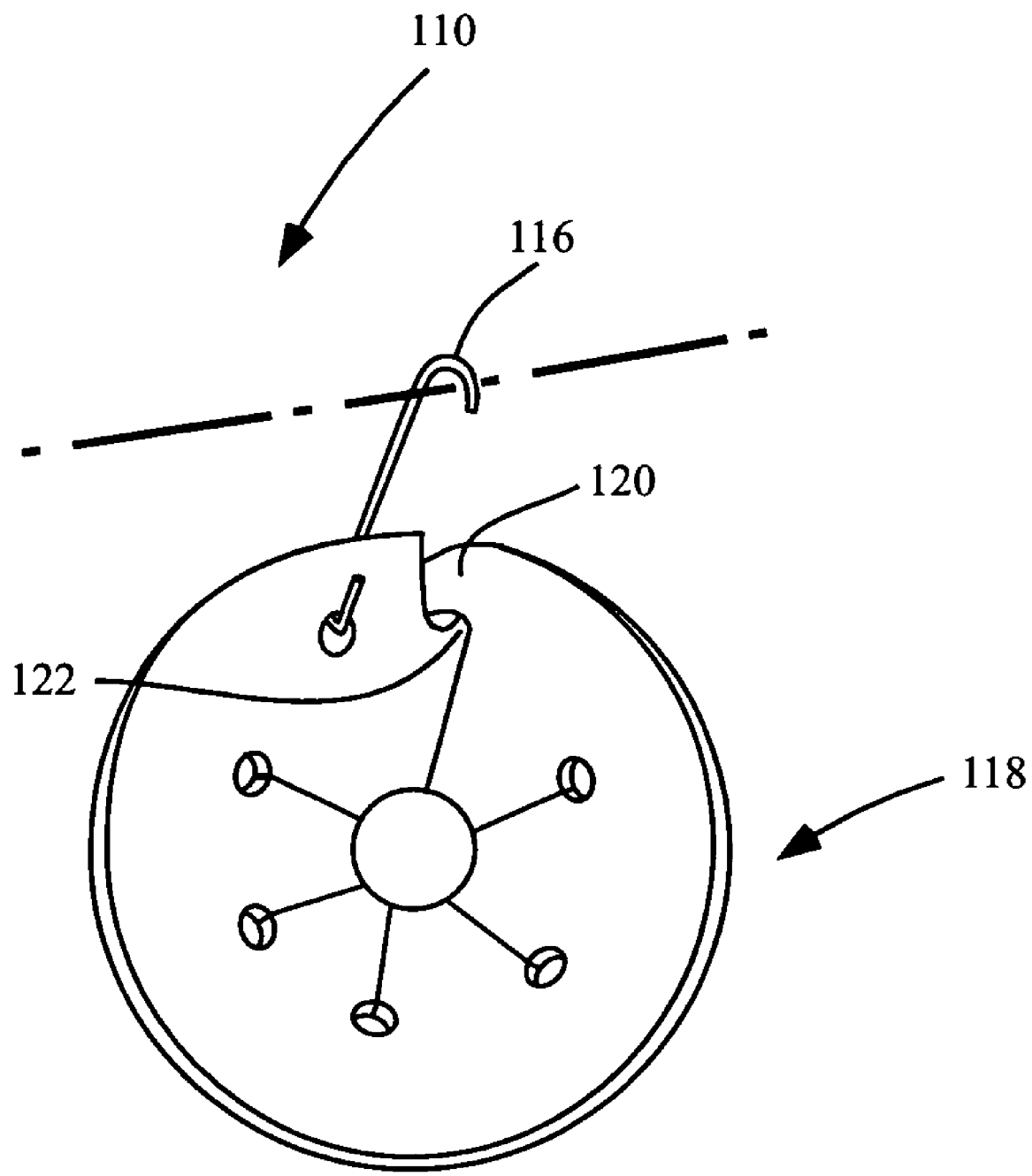
FIG. 4 shows a front view of another embodiment of the disclosed device, in which a detachable hook member is utilized.

FIGS. 4 and 5 show another embodiment 110 of the device. Similar to embodiment 10 depicted in FIGS. 1 through 3, embodiment 110 comprises attachment hook 116 for connecting the device to a support wire. However, in embodiment 110, the attachment hook 116 is not an integral part of body member 118. However, embodiment 110 does comprise an integral closing hook 120 and integral catch member 122 shown in detail in FIG. 2. Other features of embodiment 110 are similar to those discussed above for embodiment 10.

Figure 6:
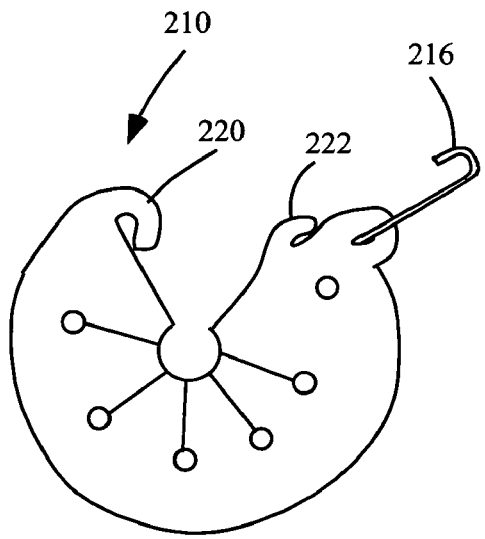
FIGS. 6 through 9 show other embodiments of the disclosed device, each which utilizes one or more detachable hook member to either suspend the device from the support wire or to "close" the device

FIG. 6 shows another embodiment 210 of the device. This embodiment 210 comprises a separate attachment hook 216 for connecting the device to a support wire. In this embodiment 210, closing hook 220 and catch member 222 are modified. Other features of embodiment 210 are similar to those discussed above for embodiment 10.

Figure 7:
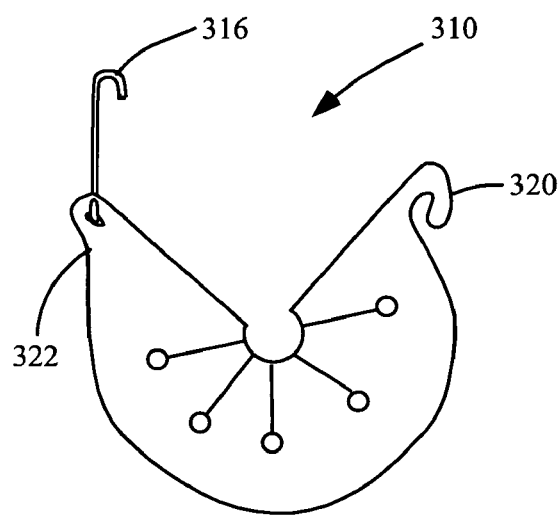

FIG. 7 shows another embodiment 310 of the device. This embodiment 310 comprises a separate attachment hook 316 for connecting the device to a support wire. In this embodiment, closing hook 320 may simply be looped around protrusion 322 which acts as a catch member. Other features of embodiment 310 are similar to those discussed above for embodiment 10.

Figure 8:
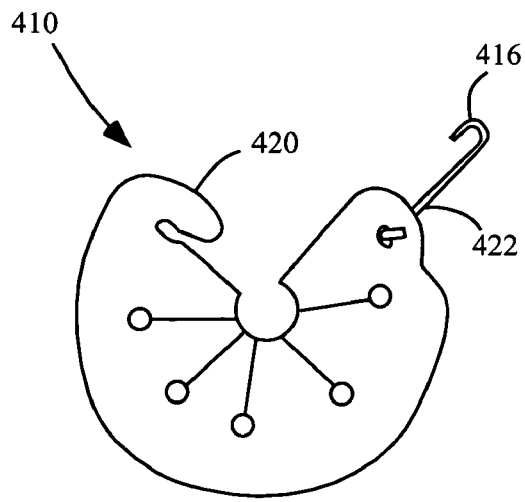

FIG. 8 shows another embodiment 410 of the device. This embodiment 410 comprises a separate attachment hook 416. In this embodiment 410, closing hook 420 may be looped around the base 422 of attachment hook 416, which serves as the catch member. Other features of embodiment 410 are similar to those discussed above for embodiment 10.

Figure 9:
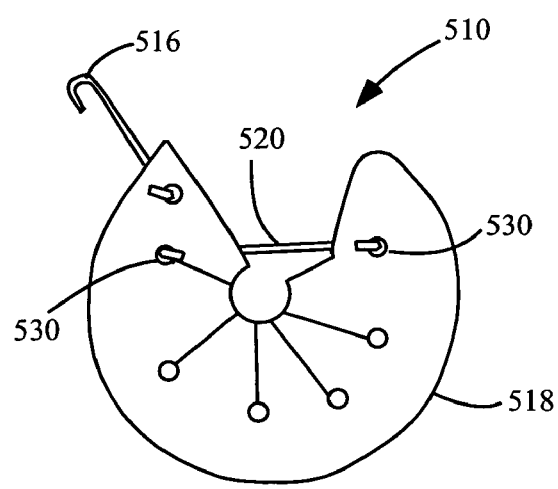

FIG. 9 shows another embodiment 510 of the device. This embodiment 510 comprises a separate attachment hook In this embodiment 510, closing hook 520 comprises a member which is distinct from the body member 518. Closing hook 520 comprises an axial member having a hook at each end. In this embodiment 510, apertures 530 serve as the catch members for the hooks at each end of closing hook 520. Other features of embodiment 510 are similar to those discussed above for embodiment 10.

Figure 10:
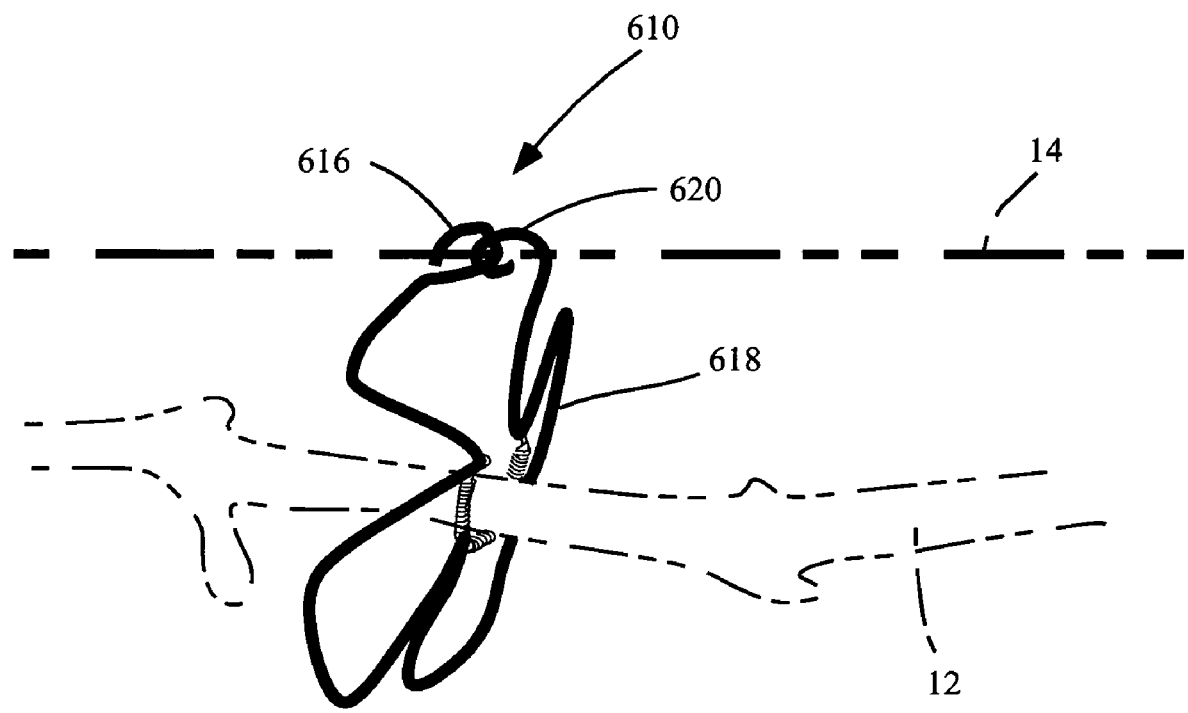
FIG. 10 shows an embodiment of the device, which utilizes a wire body member, suspending a vine from a support wire, in which a spring is used as the flexible member of the limb containment structure.

FIGS. 10 through 13 depict another embodiment 610 of the device. FIG. 10 shows the device suspending a vine 12. This embodiment 610 comprises a wire body member 618 which is fashioned from wire having mechanical properties which allow the wire body to be fashioned into various shapes, such as that shown in FIG. 11, without exceeding the elastic limit of the material. As with the embodiments discussed above, embodiment 610 comprises an attachment hook 616 to engage the overhead support wire 14, and a closing hook 620. As shown more clearly in FIG. 11, in this embodiment 610, the attachment hook 616 and closing hook 620 may be mirror images of one another. In this embodiment 610, as shown in FIG. 10, attachment hook 616 may serve as the catch member for closing hook 620. Alternatively, the attachment hook extension 621 may serve as the catch member for closing hook 620.

As with the embodiments described above, this embodiment 610 comprises biasing means for maintaining the engagement of the closing hook 620 to the catch member. However, in the case of embodiment 610, the biasing means is provided integrally by the mechanical properties of wire body member 618, and the shape into which the wire body member is configured. Assuming suitable mechanical properties of wire body member 618, if the wire body member is configured such that the closing hook 620 is spaced apart from the catch member, such as in the configuration shown in FIG. 11, compression of the device such that closing hook engages either attachment 616 or attachment hook extension 621 will impose a spring load which will maintain the device in a closed position.

Figure 11:
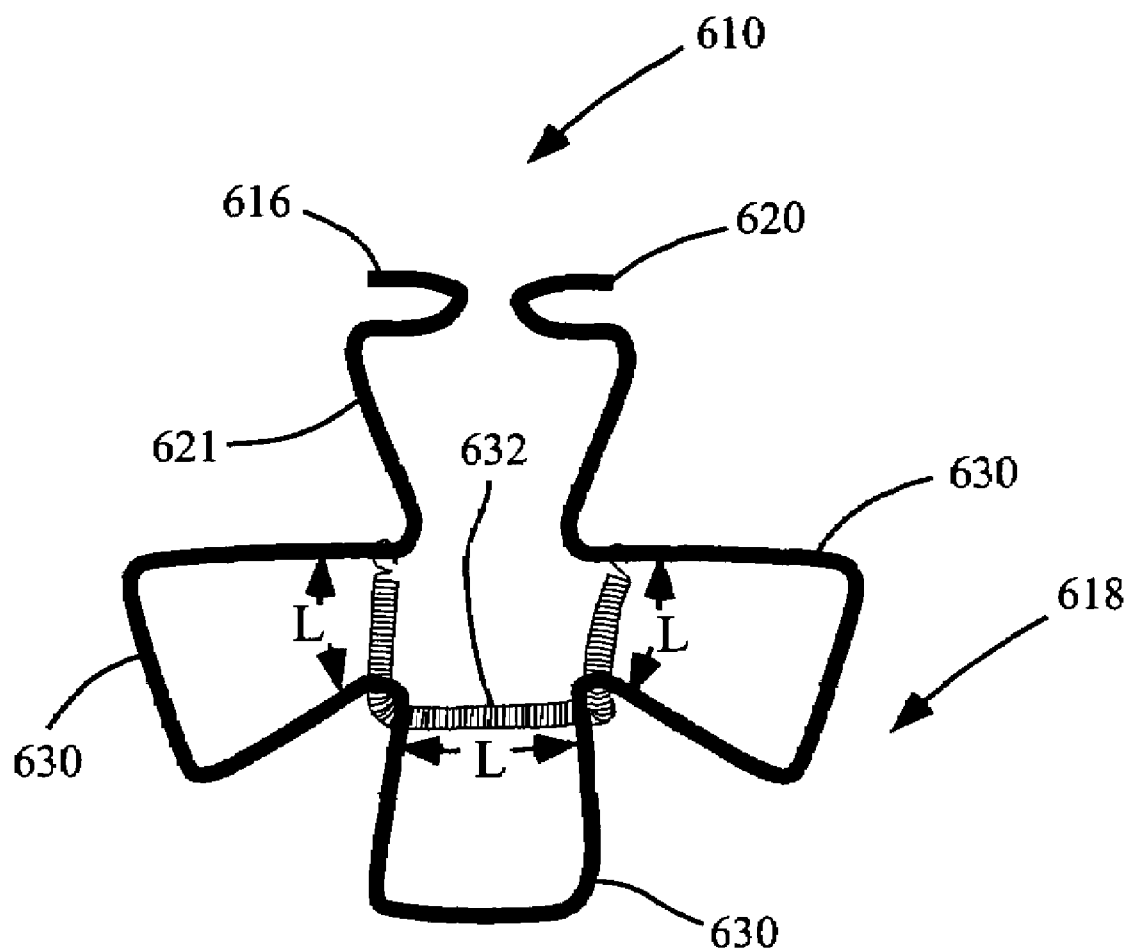
FIG. 11 shows a front view of the device shown in FIG. 10.

As shown in FIGS. 10 and 11, the wire body member 618 of this embodiment is configured to form a plurality of loop sections 630. Each loop section 630 has a throat having a variable width L, as depicted in FIG. 11. As with the previously described embodiments, embodiment 610 comprises a deformable limb containment structure to accommodate limited lateral deflection or growth in the vine or plant limb. In the case of embodiment 610, the deformable limb containment structure comprises a spring 632 which acts as flexible member which cooperatively engages the wire body member 618 such that the throat of each loop section 630 is closed by the spring.

Figure 12:
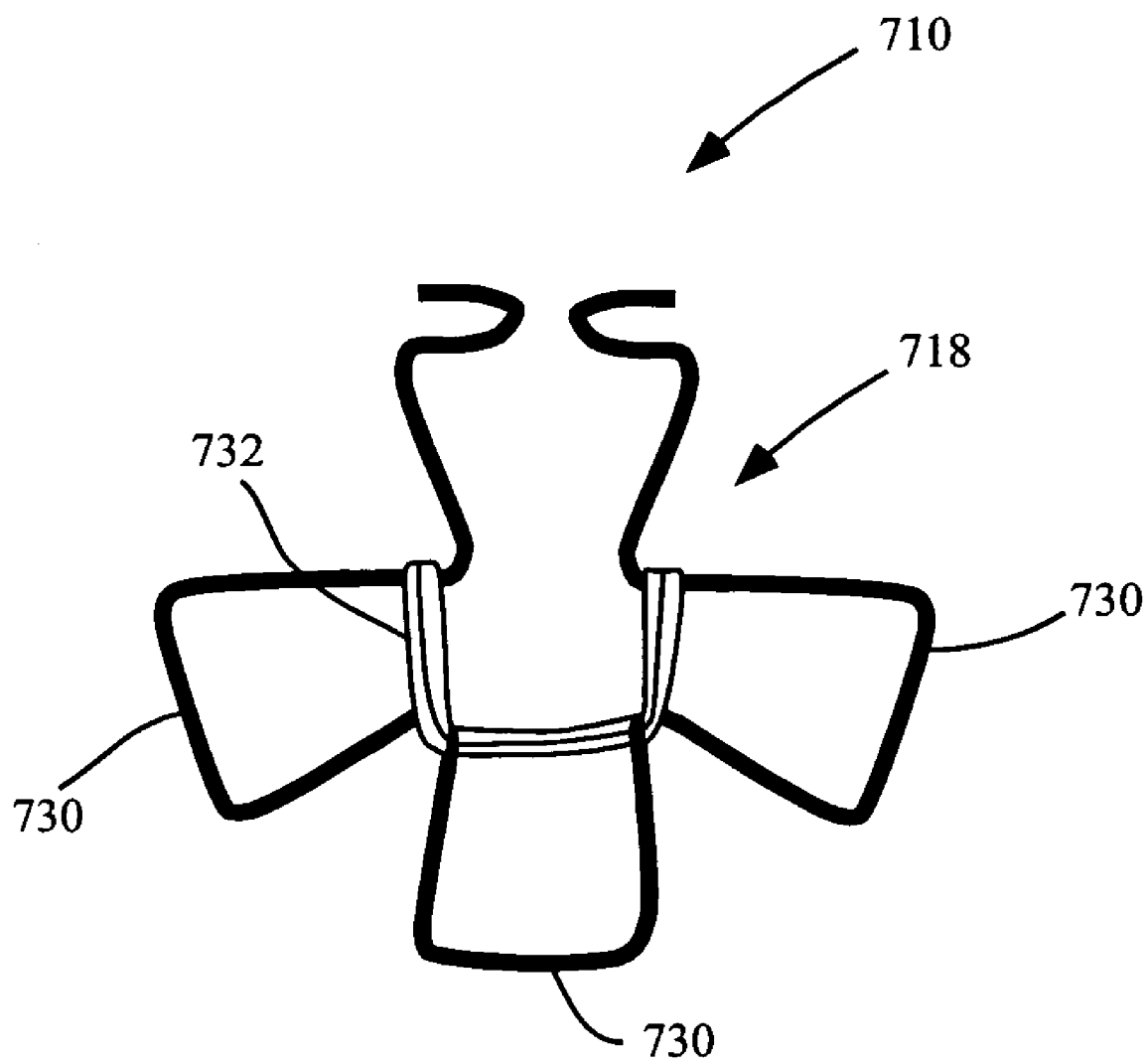
FIG. 12 shows an embodiment of the device, which utilizes a wire body member, in which an elastic band is used as the flexible member of the limb containment structure.

FIG. 12 shows another embodiment 710 of the device. This embodiment 610 is similar to that of embodiment 610, except that instead of using spring 632 as a flexible member, an elastic band 732 is utilized as the flexible member, which cooperatively engages wire body member 718 such that the throat of each loop section 730 is closed by the elastic band.

Figure 13:
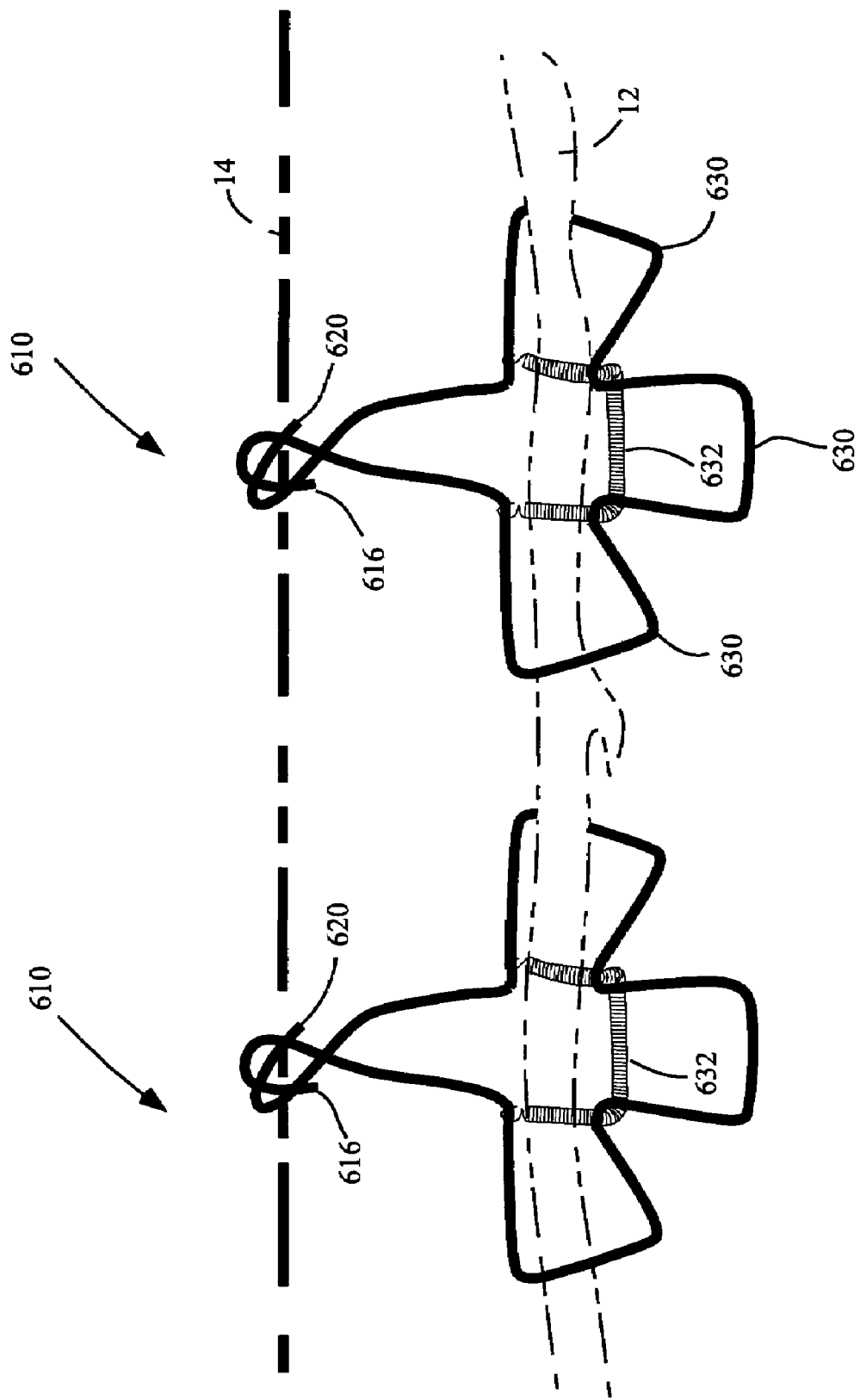
FIG. 13 shows how multiple devices may be utilized to suspend a vine from a support wire.

It is to be appreciated that for all of the embodiments described above, that multiple devices may be employed to support a vine or branch member 12 from a support wire 14. For example, as shown in FIG. 13 for embodiment 610, the embodiments of the disclosed apparatus may be spaced apart as desired to support the vine or branch member 12 from the support wire.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A device for attaching a vine or plant limb to an overhead support wire, the device comprising:
   an attachment hook configured to engage the overhead support wire; and
   a body member comprising:
      a closing hook;
      a catch member for engaging the closing hook;
      a deformable limb containment structure, wherein the limb containment structure deforms to accommodate limited lateral deflection or growth in the vine or plant limb, the deformable limb contain structure having a planar configuration when the closing hook is not engaged with the catch member and having a non-planar configuration when the closing hook is engaged with the catch member; and
      biasing means for maintaining the engagement of the closing hook to the catch member;
   wherein the attachment hook is configured to suspend the body member to the overhead support wire.

2. The device of claim 1 wherein the biasing means is integral to the device.

3. The device of claim 1 wherein the body is a single elastic body member.

4. The device of claim 3 wherein the body member is circular in shape.

5. The device of claim 3 wherein the limb containment structure comprises a central aperture having a plurality of outwardly radiating splits, each split terminating at a secondary aperture.

6. A device for attaching a vine or plant limb to an overhead support wire, the device comprising:
   a body member comprising an integral attachment hook configured to engage the overhead support wire;
   the body member further comprises:
      an integral closing hook;
      an integral catch member for engaging the closing hook;

an integral deformable limb containment structure, wherein the limb containment structure deforms to accommodate limited lateral deflection or growth in the vine or plant limb, the deformable limb contain structure having a planar configuration when the closing hook is not engaged with the catch member and having a non-planar configuration when the closing hook is engaged with the catch member:

and integral biasing means for maintaining the engagement of the closing hook to the catch member;

wherein the attachment hook is configured to suspend the body member to the overhead support wire.

7. The device of claim 6 wherein the body member is circular in shape.

8. The device of claim 6 wherein the limb containment structure comprises a central aperture having a plurality of outwardly radiating splits, each split terminating at a secondary aperture.

* * * * *